May 7, 1940.  J. J. CONOVER  2,199,618
HAY CUTTING SAW
Filed July 20, 1939  2 Sheets-Sheet 1
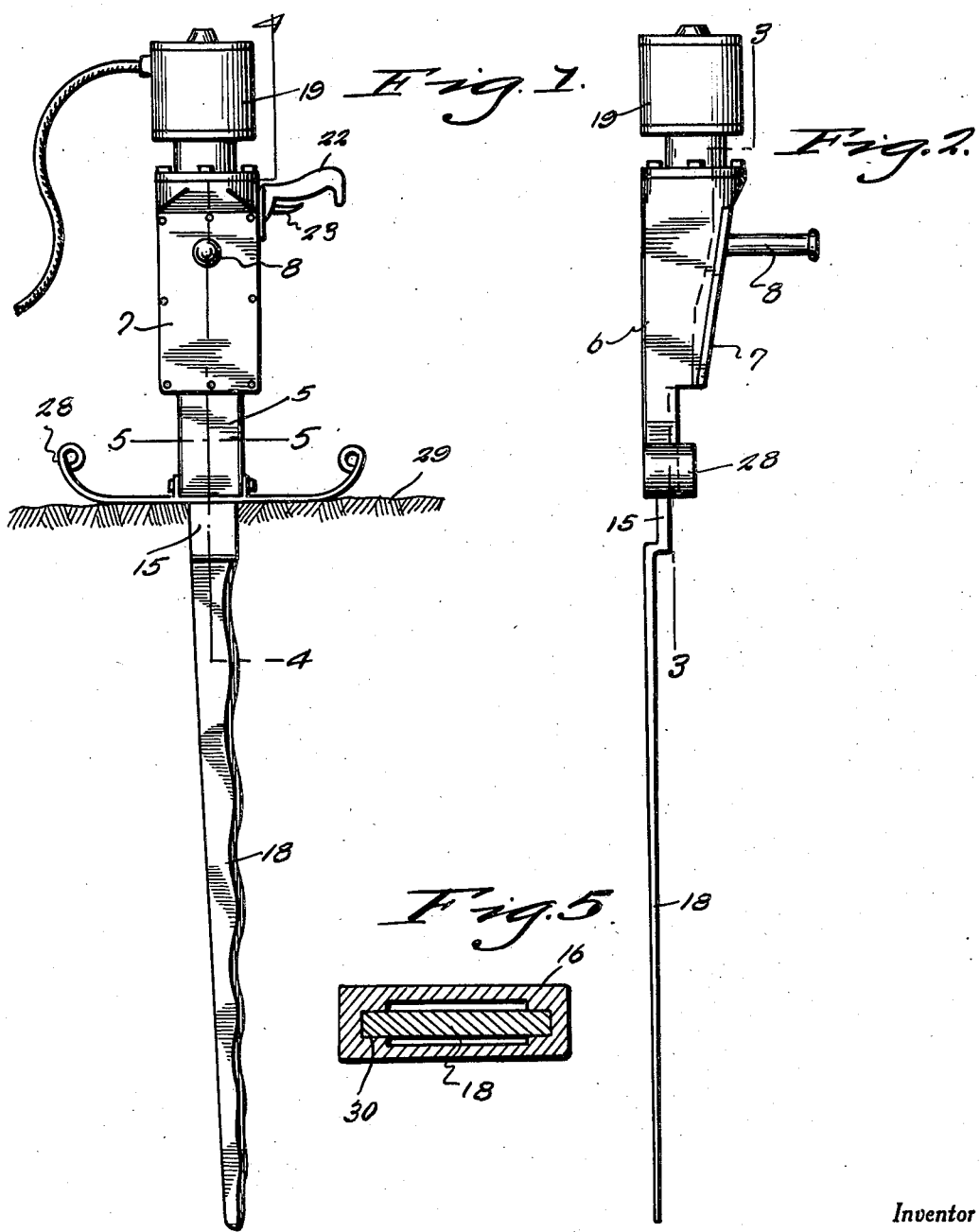
Inventor
James J. Conover
By Clarence A. O'Brien
and Hyman Berman
Attorneys May 7, 1940.   J. J. CONOVER   2,199,618
HAY CUTTING SAW
Filed July 20, 1938   2 Sheets-Sheet 2

Inventor
James J. Conover
By Clarence A. O'Brien
and Hyman Berman
Attorneys

Patented May 7, 1940

2,199,618

UNITED STATES PATENT OFFICE 2,199,618

HAY CUTTING SAW

James J. Conover, Columbia, Ky.

Application July 20, 1938, Serial No. 220,383

4 Claims. (Cl. 30—272)

The present invention relates to saws for cutting hay from stacks and has for its primary object to provide a power driven saw of a portable type adapted for convenient moving from place to place over a hay stack for cutting portions thereof from the stack.

In large stacks of hay the material becomes packed so solidly that it has been found impossible to conveniently remove portions of the stack by means of pitchforks and the like, and accordingly, it is an object of the present invention to provide a portable power driven saw designed to cut into the hay stack for the purpose of conveniently removing portions thereof.

A further object is to provide a device of this character of simple and practical construction, which is efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof wherein like numerals refer to like parts throughout, and in which—

Figure 1 is a side elevational view showing the saw in cutting position with the guard resting upon the upper edge of the cut.

Figure 2 is an edge elevational view.

Figure 5 is a transverse sectional view taken substantially on a line 5—5 of Figure 1.

Figure 3:
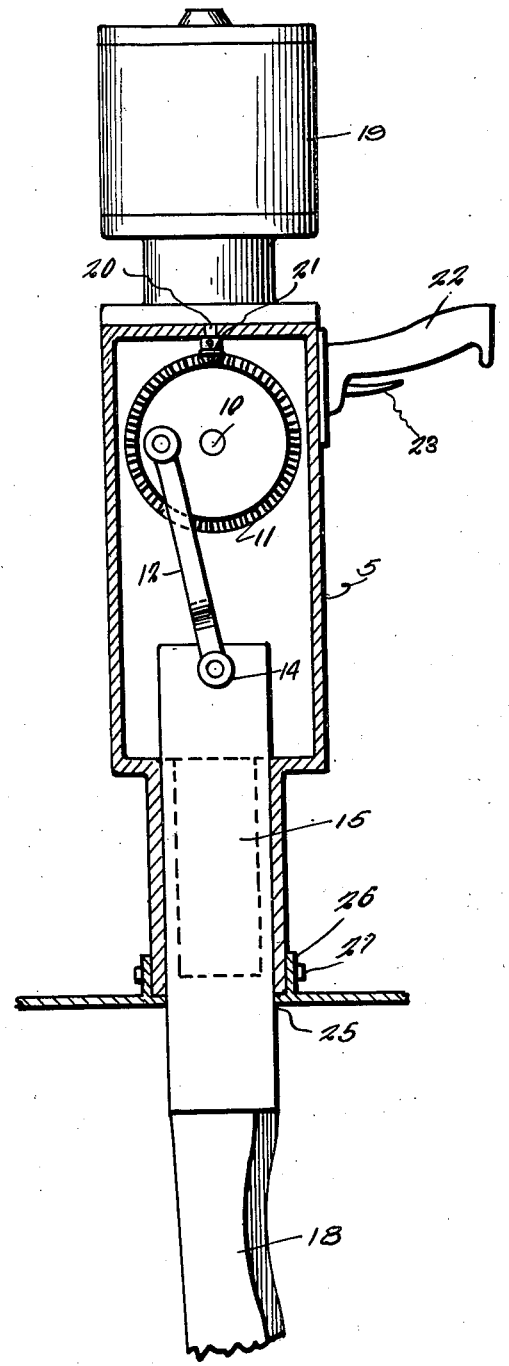
Figure 3 is a vertical sectional view taken substantially on a line 3—3 of Figure 2.

Referring now to the drawings in detail, wherein for the purpose of illustration I have disclosed a preferred embodiment of the invention, the numeral 5 designates a gear housing having a rear flat side 6 and a cover plate 7 removably secured to the front side of the housing and provided with a hand grip 8 projecting laterally from the housing.

Figure 4:
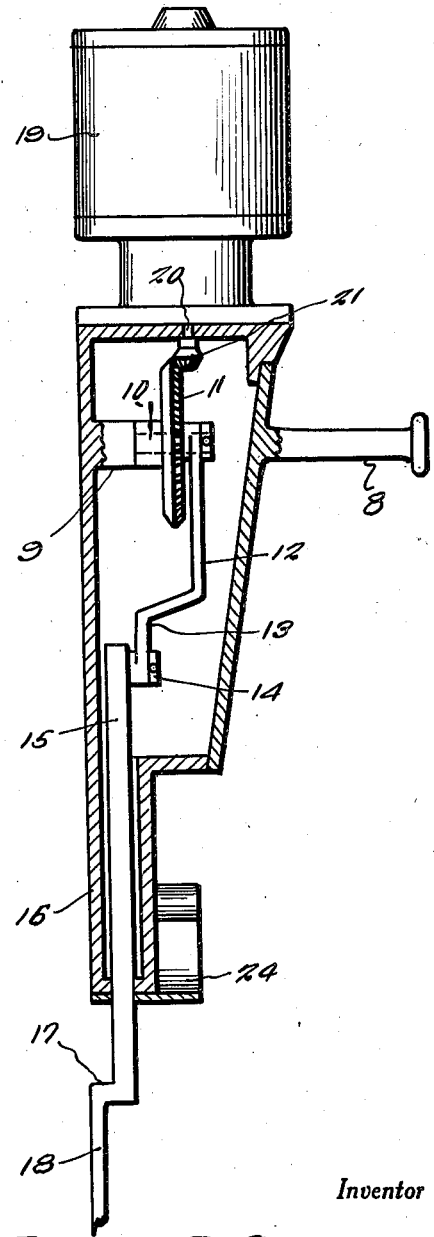
Figure 4 is a similar view taken substantially on a line 4—4 of Figure 1.

Within the housing is a bracket 9 having a shaft 10 formed thereon on which is freely mounted a ring gear 11 having one end of a pitman arm 12 eccentrically secured thereto, the opposite end of the arm being off-set as shown at 13 in a direction toward the rear 6 of the housing and pivotally secured as at 14 to one end of a saw 15. The lower end of the housing 5 is provided with the reduced extension 16 within which the connected end of the saw is reciprocally mounted, said saw, outwardly of the housing, being also off-set as shown at 17 to position the saw blade 18 in the plane of the rear of the housing 6 as will be apparent from an inspection of Figures 2 and 4 of the drawings.

To the top of the housing 5 is detachably secured a suitable power plant indicated generally at 19 and which may be either in the form of an electric motor, as illustrated in the drawings, or may comprise a small internal combustion engine. A shaft 20, operated by the motor, projects through the top of the housing and is provided with a bevel pinion gear 21 in operative engagement with the ring gear 11 for driving the latter. One edge of the housing is also provided with a handle 22 having a control switch or lever 23 for controlling the motor 19.

To the bottom of the housing is secured a guard 24 which is in the form of an elongated strip of material having an opening 25 through which the inner end of the saw reciprocates and the upper surface of the guard is provided with upstanding flanges 26 bolted as at 27 to the lower end of the housing. The ends of the guard are curved upwardly as shown in Figure 1 of the drawings, to prevent the ends of the guard from digging into the hay-stack designated generally at 29.

As more clearly illustrated in Figure 5 of the drawings the edge portions of the connected end of the blade 15 are slidably positioned in guide channels 30 formed in the housing extension 16.

In the operation of the device the saw is manipulated by a workman standing on top of the hay-stack and the free end of the blade 18 is more or less pointed to facilitate penetration into the hay and upon the reciprocation of the blade the saw may be conveniently guided to cut the desired portion of hay from the stack. The guard 24 constitutes a shoe which facilitates the sliding of the saw along the upper surface of the stack during the cutting action.

The off-set arrangement of the saw with respect to its connected end so as to lie in the plane of the rear 6 of the housing is to enable subsequent cutting downwardly through the stack in a vertical line after the first cut has been made in the top of the stack and the guard 24 will then rest upon the shelf thus formed by the removal of the cut portion.

It is to be also understood that the saw may be used for cutting portions of the hay in a horizontal position as well as in a vertical position as shown in Figure 1.

It is believed the details of construction and manner of operation of the device will be readily understood from the foregoing without further detailed explanation.

Having thus described the invention, what I claim is:

1. In a hay saw, a housing having a flat rear surface, a saw blade having one end reciprocally mounted in one end of the housing, said saw blade having its cutting portion off-set in the plane of the rear of the housing and power drive means for the saw.

2. A portable hay saw comprising a housing having a flat rear surface, a saw blade having one end reciprocally mounted in one end of the housing, the cutting portion of the blade being offset in the plane of the rear surface of said housing, a power plant carried by the housing and means operatively connecting the power plant to the saw blade.

3. A portable hay saw comprising a housing having a flat rear surface, a saw blade having one end reciprocally mounted in one end of the housing, the cutting portion of the blade being offset in the plane of the rear surface of said housing, a power plant carried by the housing and means operatively connecting the power plant to the saw blade and a shoe connected to the housing.

4. A portable hay saw comprising a housing having a flat rear surface, a saw blade having one end reciprocally mounted in one end of the housing, the cutting portion of the blade being offset in the plane of the rear surface of said housing, a power plant carried by the housing and means operatively connecting the power plant to the saw blade and a shoe connected to the housing, said shoe comprising a plate having an opening through which the blade is slidably positioned and having end portions curved upwardly and rolled to provide rounded ends for the shoe.

JAMES J. CONOVER.